US005916657A

United States Patent [19]

Magallanes et al.

[11] Patent Number: 5,916,657

[45] Date of Patent: Jun. 29, 1999

[54] THREE-DIMENSIONAL FORMABLE SHEET MATERIAL FIGURINE ATTACHMENTS FOR PROTECTIVE HELMETS

[76] Inventors: Jeff Magallanes; Piper Magallanes, both of 208 Barbee Ct., Marina, Calif. 93933

[21] Appl. No.: 08/902,173

[22] Filed: Jul. 29, 1997

[51] Int. Cl.[6] .......... B32B 3/02

[52] U.S. Cl. .......... 428/79; 428/187; 428/200; 428/343; 428/475.5; 428/195

[58] Field of Search .......... 428/79, 187, 355, 428/200, 542.2, 347, 343, 480, 475.5, 485, 195

[56] References Cited

U.S. PATENT DOCUMENTS

| | | | |
|---|---|---|---|
| 4,786,349 | 11/1988 | Mahn, Sr. | 156/234 |
| 4,971,644 | 11/1990 | Mahn, Sr. et al. | 156/253 |
| 5,133,819 | 7/1992 | Croner | 156/230 |
| 5,149,589 | 9/1992 | Naritomi et al. | 428/412 |
| 5,338,603 | 8/1994 | Mahn, Sr. et al. | 428/349 |
| 5,411,783 | 5/1995 | Mahn, Jr. | 428/79 |
| 5,556,491 | 9/1996 | Servanty et al. | 156/64 |
| 5,622,587 | 4/1997 | Barthelman | 156/251 |

*Primary Examiner*—Merrick Dixon
*Attorney, Agent, or Firm*—Leo F. Costello

[57] ABSTRACT

An article of wearing apparel for the head and a method making the same. The article includes a helmet having an upper outer surface, a three-dimensional, simulated animal figure cut out of resiliently flexible sheet material with the figure having a simulated animal head and simulated opposite animal body portions extended rearwardly from the head in transversely spaced relation to each other. The head and the body portions are fastened to the outer surface of the helmet so that the figure is in upstanding position on the helmet and appears as a simulated animal on top of the helmet but can be resiliently pressed downwardly against the helmet. The method includes cutting out of a sheet of resiliently flexible material a two-dimensional pattern of a desired animal figure that has a head and a pair of body portions so with the pattern laid out flat, the body portions individually project outwardly from the head about an imaginary line of symmetry extending between the head portions, folding the head on the line of symmetry to form a pair of head portions and to bring the head portions into face-to-face relationship and the body portions into face-to-face relationship, and joining at least one pair of the face-to-face portions thereby to form a three-dimensional figure.

17 Claims, 13 Drawing Sheets

THREE-DIMENSIONAL FORMABLE SHEET MATERIAL FIGURINE ATTACHMENTS FOR PROTECTIVE HELMETS

FIELD OF INVENTION

This invention relates to figurines for placement upon protective helmets. This invention has been created to inspire children to wear protective helmets, while bicycling, skateboarding, or rollerblading, as required by law in some states.

BACKGROUND

In many states, law requires the use of protective helmets while bicycling, rollerblading, or skateboarding. Helmet manufacturers attempt to inspire children to wear helmets by offering a wide range of colors and styles. Although these attempts, along with educational campaigns on helmet safety have been made by the helmet manufacturers, and the communities, thousands of children still suffer head injuries annually.

According to a U.S. Consumer Product Safety Commission report, while bicycling, young children were more likely not to be wearing a helmet at the time of a head related injury. In bicycling alone, it is reported by Johns Hopkins Injury Prevention Center that there are some 65,000 emergency room cases annually. These individuals wore no head protection and the highest rate of incidence occurred in children aged 5 to 15. The same is true in other endeavors such as skateboarding or rollerblading.

Presently, helmet manufacturers are limited to the shape (for structural integrity) and color of their protective helmets. They are faced with the difficulties of aerodynamics, venting, structural soundness, and weight, thus any attempts to change or add ridged components of the existing structure of protective helmets could possibly interfere with the effectiveness of the structure as a whole. It is, therefore, an object of the present invention, to provide an inspirational means in which the figurines will encourage children aged 5 and above to wear protective helmets while biking, rollerblading, skateboarding, and all other endeavors requiring protective helmets.

SUMMARY

An article of wearing apparel for the head and a method making the same are disclosed. The article includes a helmet having an upper outer surface, a three-dimensional, simulated animal figure cut out of resiliently flexible sheet material with the figure having a simulated animal head and simulated opposite animal body portions extended rearwardly from the head in transversely spaced relation to each other. The head and the body portions are fastened to the outer surface of the helmet so that the figure is in upstanding position on the helmet and appears as a simulated animal on top of the helmet but can be resiliently pressed downwardly against the helmet. The method includes cutting out of a sheet of resiliently flexible material a two-dimensional pattern of a desired animal figure that has a head and a pair of body portions so with the pattern laid out flat, the body portions individually project outwardly from the head about an imaginary line of symmetry extending between the head portions, folding the head on the line of symmetry to form a pair of head portions and to bring the head portions into face-to-face relationship and the body portions into face-to-face relationship, and joining at least one pair of the face-to-face portions thereby to form a three-dimensional figure.

An object of this invention is to inspire children aged five and above to wear protective helmets while biking, rollerblading, skateboarding, and all other endeavors which require protective helmets.

Another object is to reduce head injuries while biking, rollerblading, skateboarding, and all other endeavors requiring protective helmets.

A further object is to provide an economical means to inspire those who would otherwise not wear head protection to do so.

Yet another object is to provide a protective helmet attachment that does not interfere with the structural soundness of the helmet during impact or with the cooling or venting effect of the protective helmet.

Another object is to provide a protective helmet that is weather proof, rigid yet flexible, aerodynamic, stable, easy to use, and lightweight.

A still further object is to provide a protective helmet with a three-dimensional, simulated animal figure that does not interfere with the normal use and effectiveness of the helmet.

Yet an additional object is to provide a method for making a three-dimensional animal figure that may be mounted on a protective helmet or used otherwise.

The foregoing and other objects and features of the present invention can be more readily understood with reference to the following description and in conjunction with the accompanying figures with like reference numerals that designate like structural elements.

DESCRIPTION OF THE PREFERRED EMBODIMENT

Figure 1:
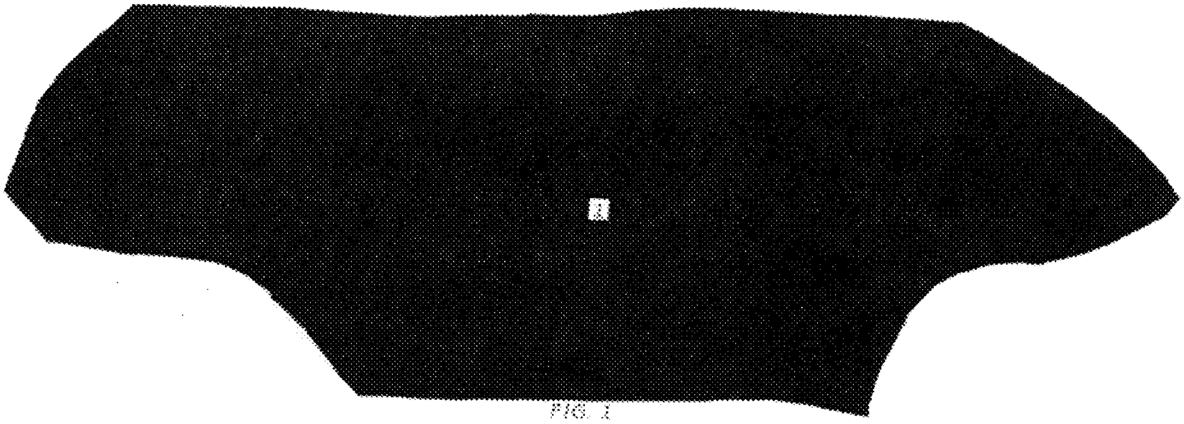
FIG. 1 is a top view of the formable sheet material.
Figure 2:
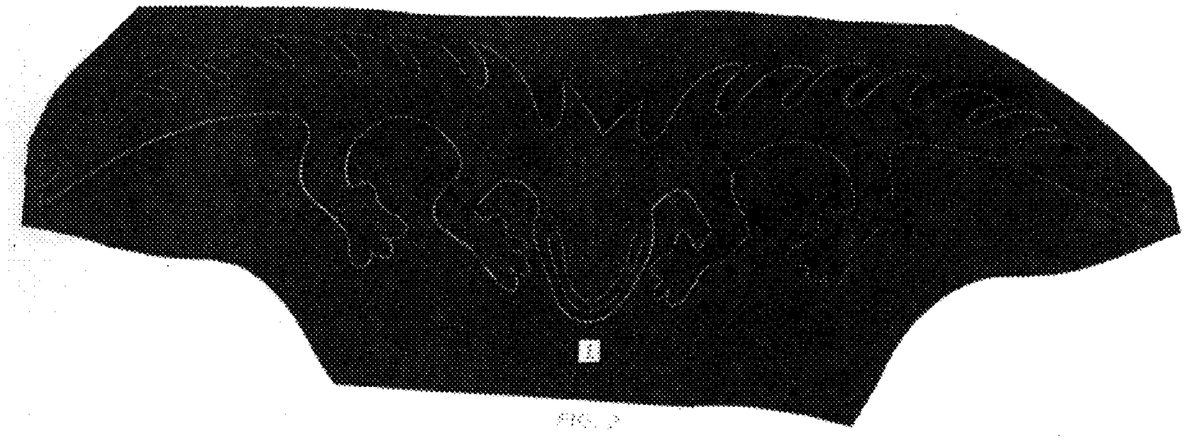
FIG. 2 is a top view of the formable sheet material with a pattern drawn on it.
Figure 3:
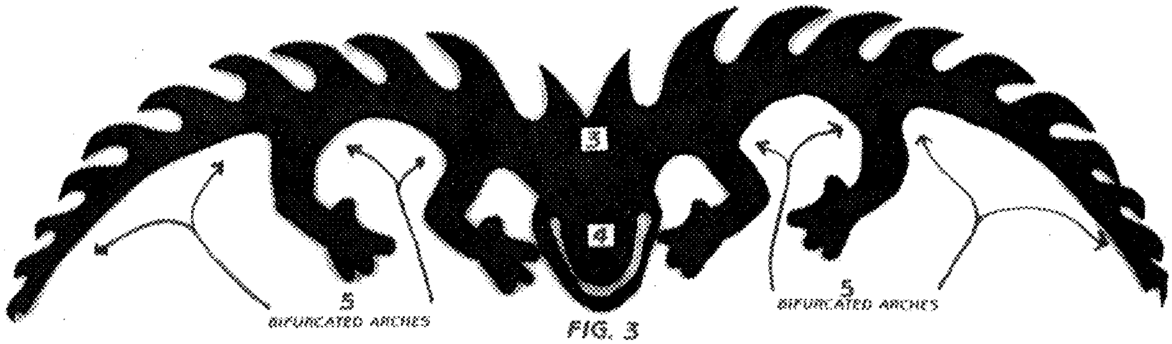
FIG. 3 is a top view of the formable sheet material mortise (cut out) illustrating bifurcated arches and nose area.
Figure 4:
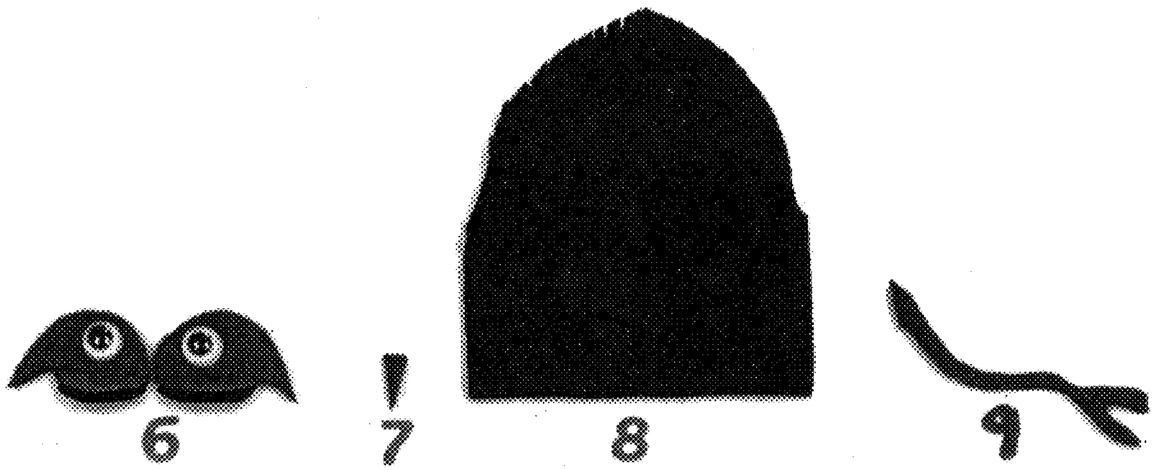
FIG. 4 is a top view of eyes, tooth, hair, and tongue.
Figure 5:
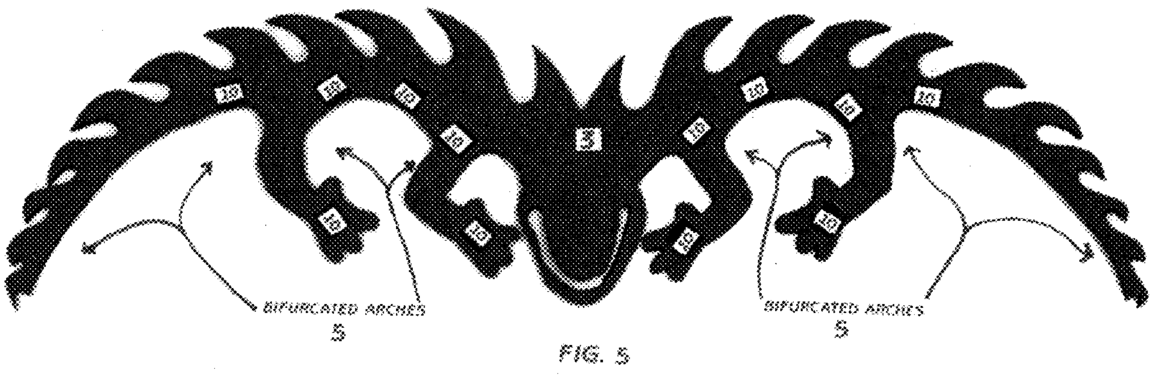
FIG. 5 is a top view of the self-adhesive hook and loop fasteners attached to the underside bottom edge of the formable sheet material mortise along the bifurcated arches in FIG. 3.
Figure 6:
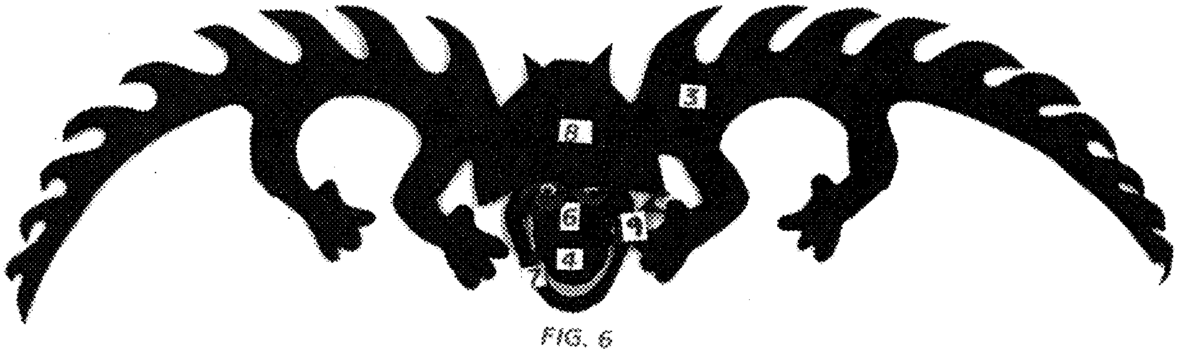
FIG. 6 is a top view of eyes, tooth, hair, and tongue after means of adhesion to formable sheet material mortise nose area FIG. 3.
Figure 7:
FIG. 7 is a top view of resultant connection of the left and right halves by means of adhesion of the nose area of the formable sheet material mortise in FIG. 3, and FIG. 6.
Figure 8:
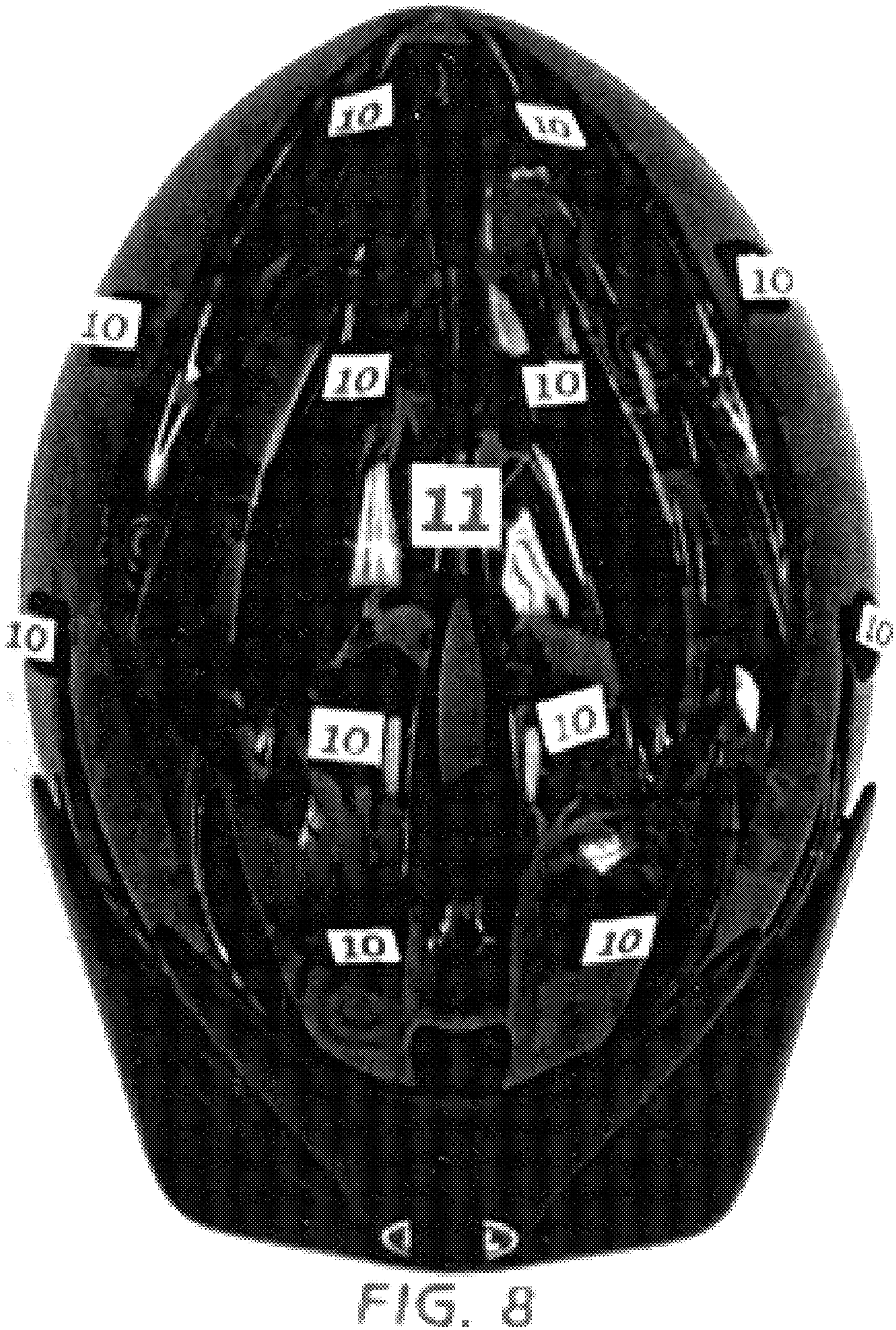
FIG. 8 is a top view of a protective helmet and the placement of self-adhesive hook and loop fasteners.
Figure 9:
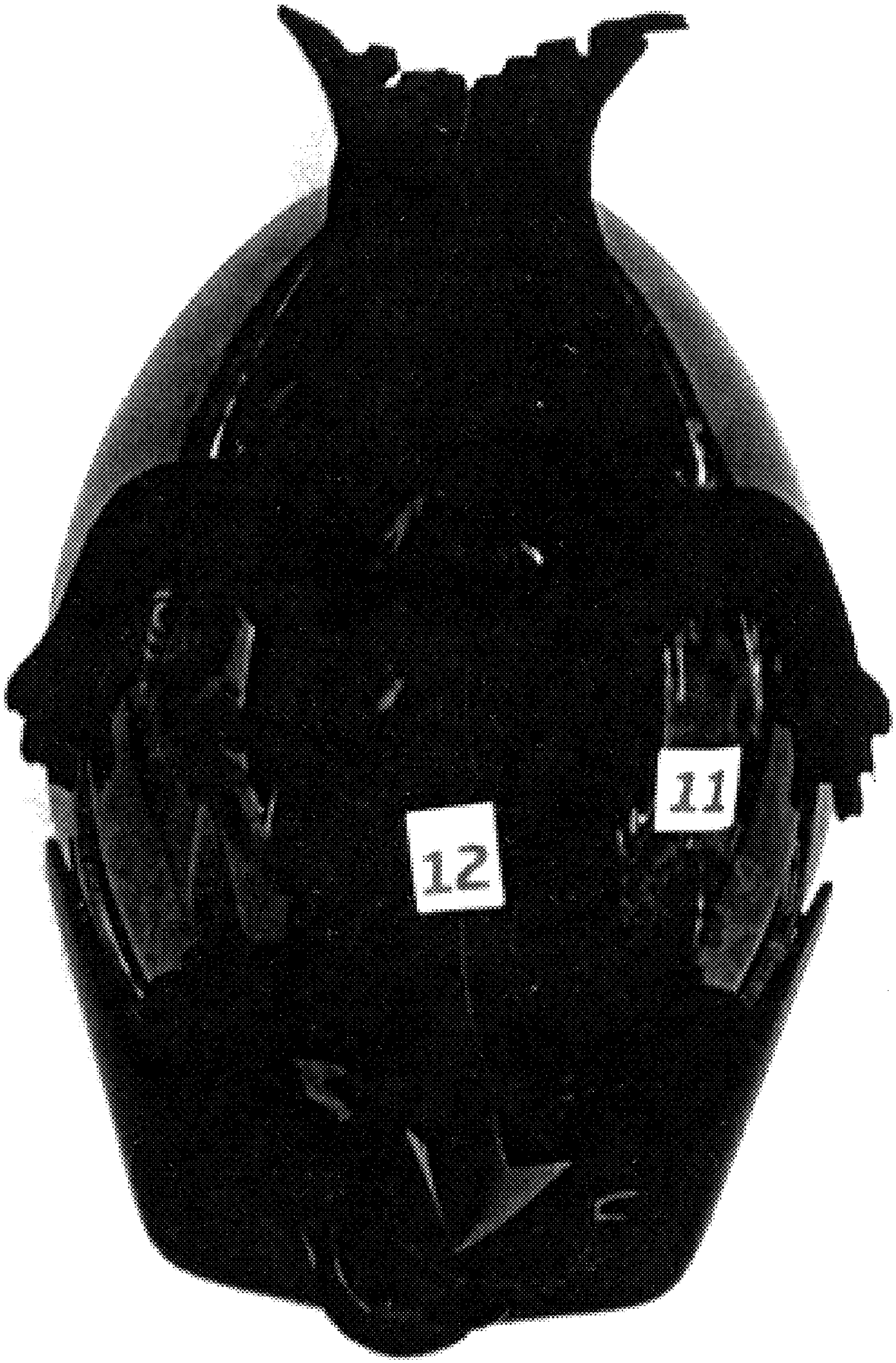
FIG. 9 is a top view of the figurine FIG. 7 placed on top of protective helmet in FIG. 8.
Figure 10:
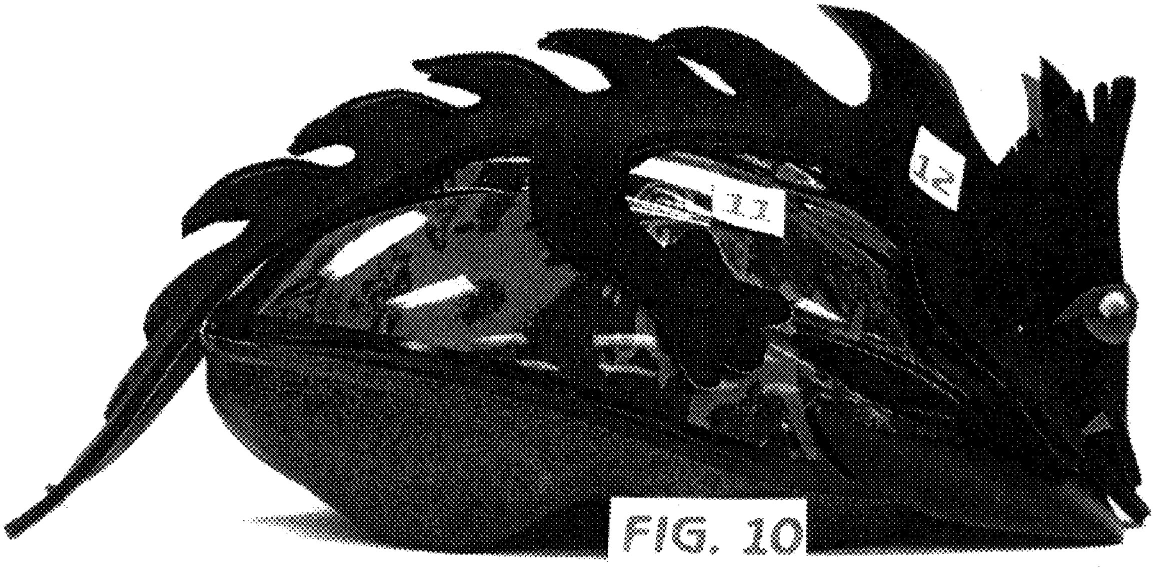
FIG. 10 is a right side view of the figurine FIG. 7 placed on top of the protective helmet in FIG. 8.
Figure 11:
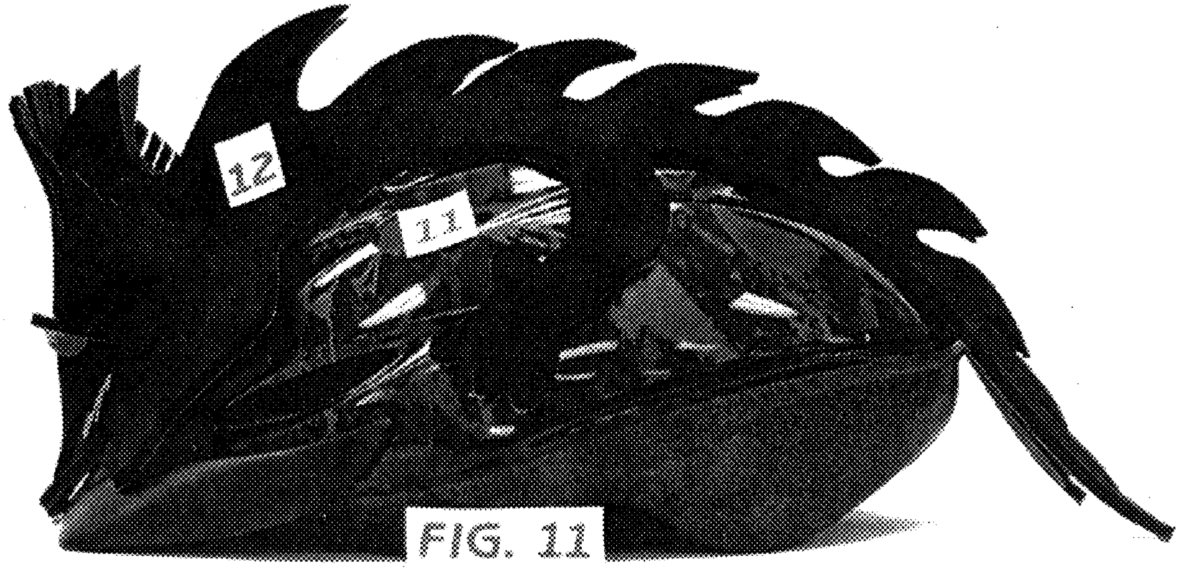
FIG. 11 is a left side view of the figurine FIG. 7 placed on top of protective helmet in FIG. 8.
Figure 12:
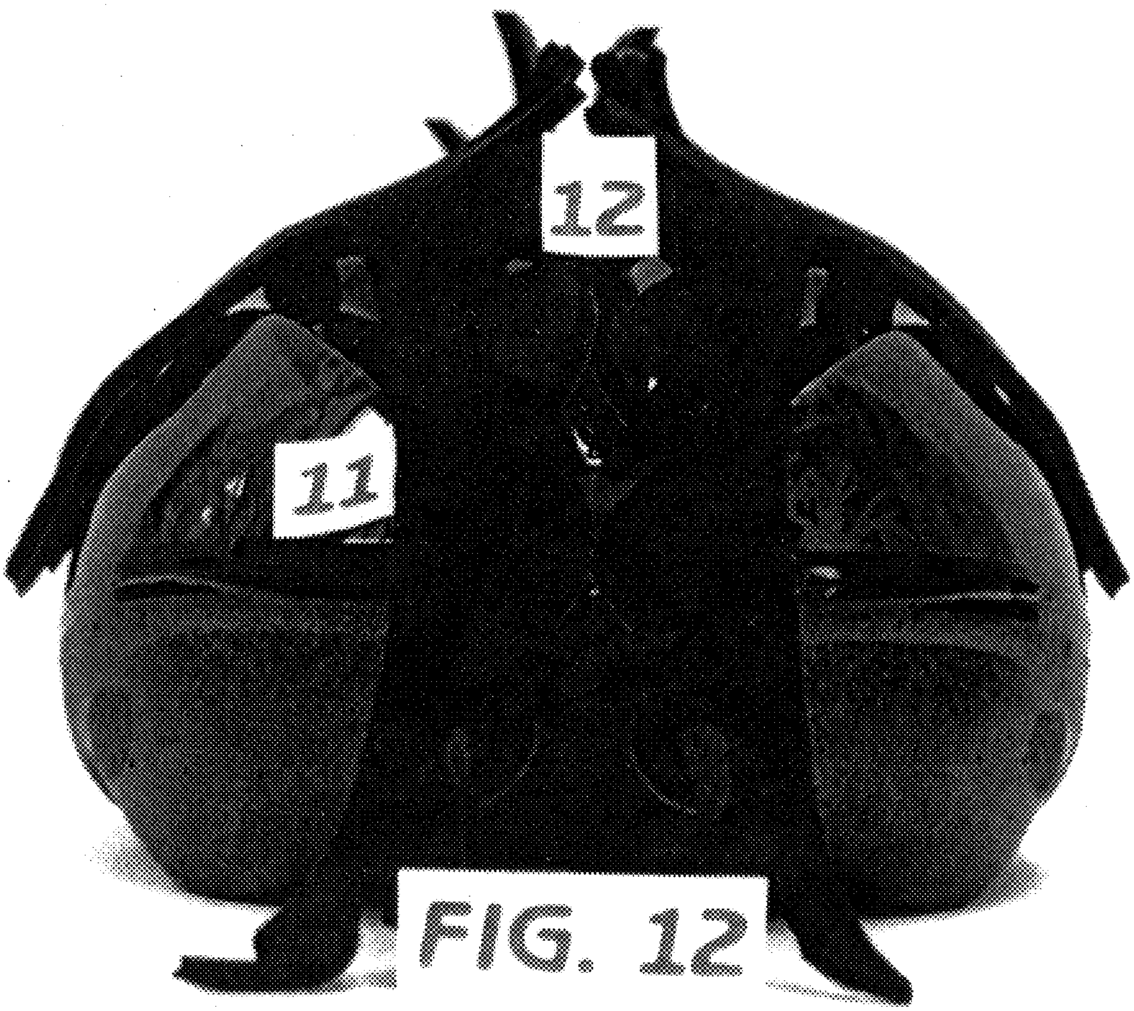
FIG. 12 is a rear view of the figurine FIG. 7 placed on top of protective helmet in FIG. 8.
Figure 13:
FIG. 13 is a frontal view of the figurine FIG. 7 placed on top of protective helmet in FIG. 8.
Figure 1:
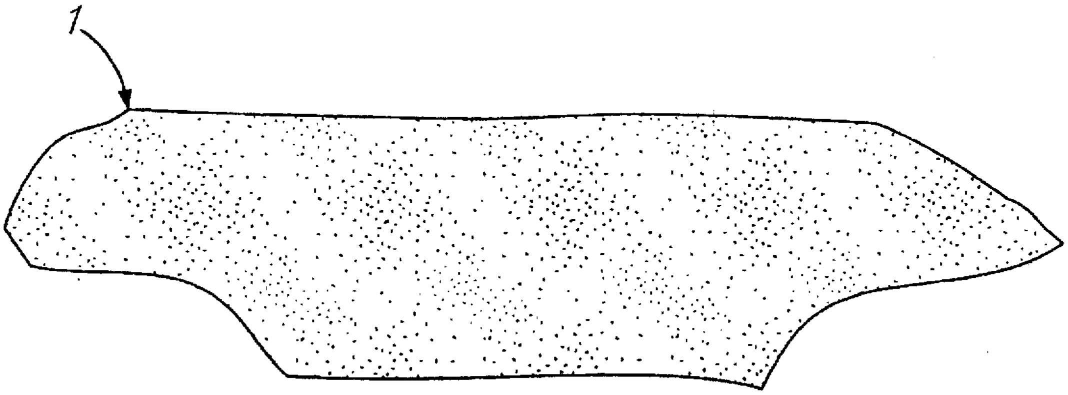
Figure 2:
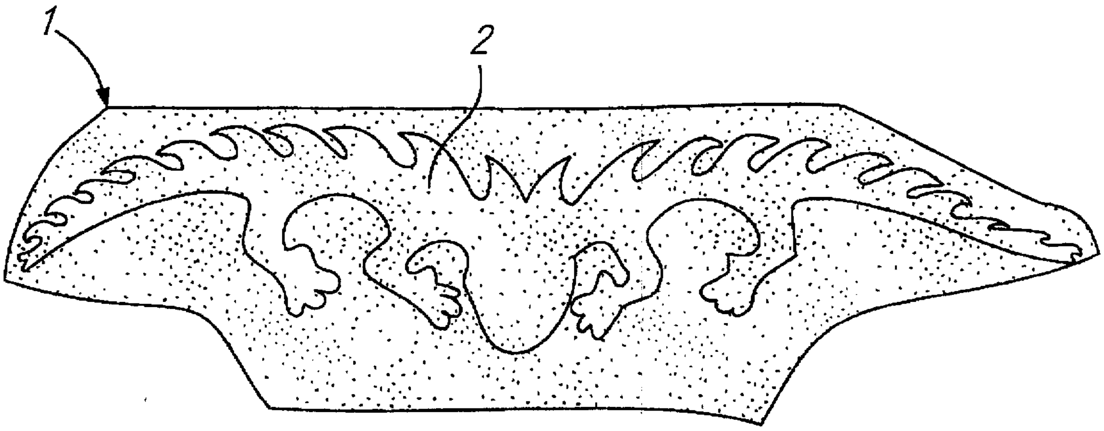
Figure 3:
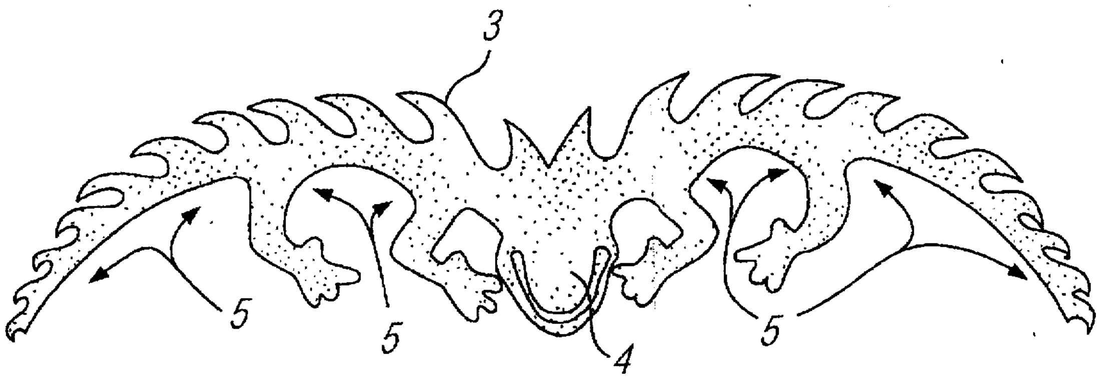
Figure 4:
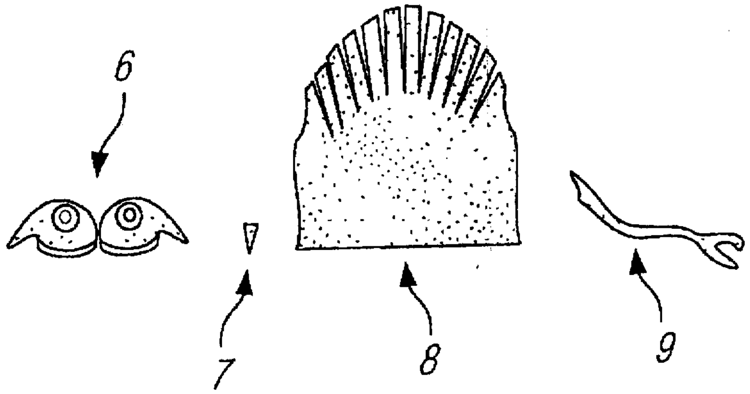
Figure 5:
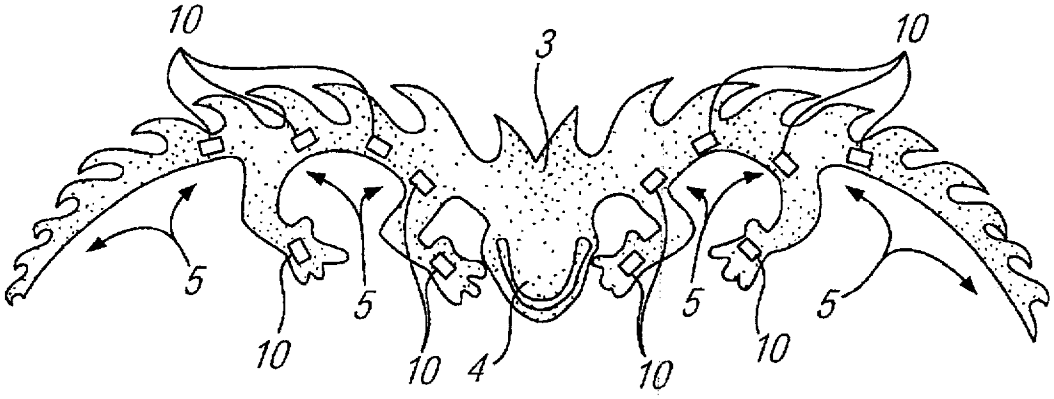
Figure 6:
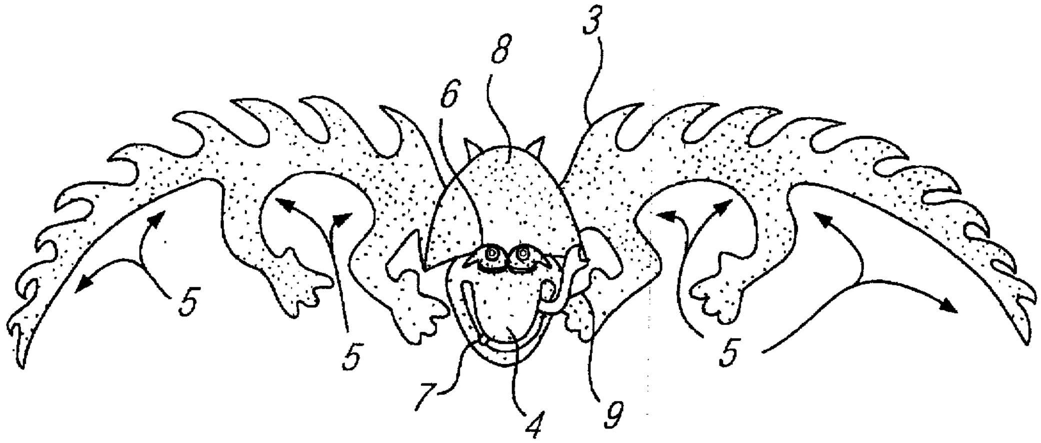
Figure 7:
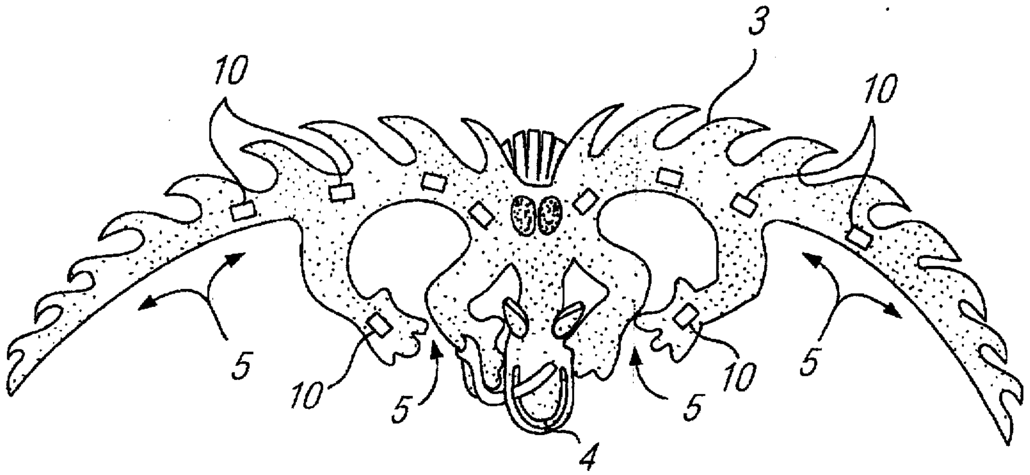
Figure 8:
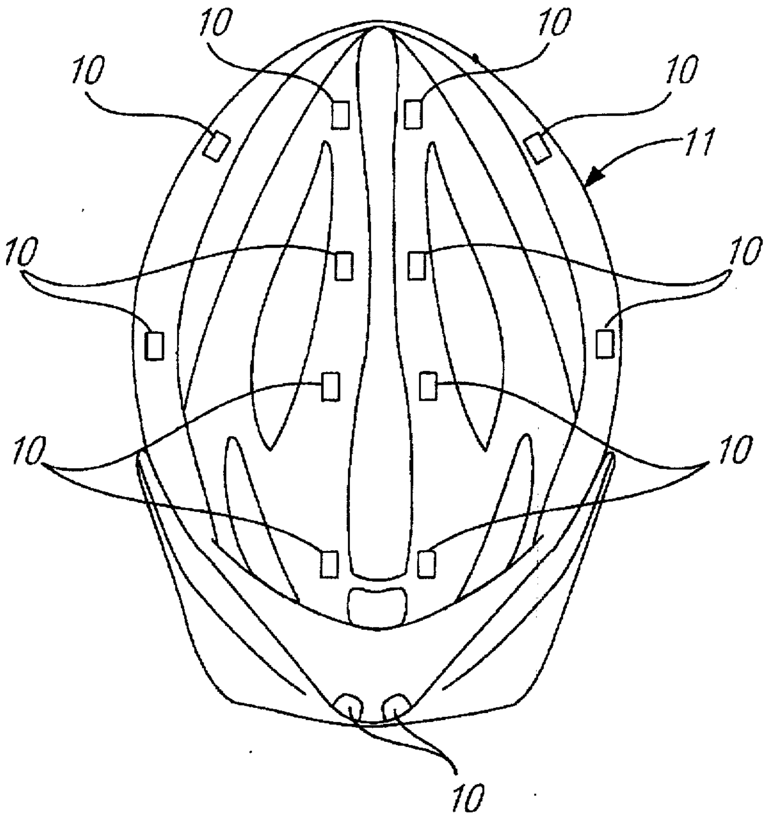
Figure 9:
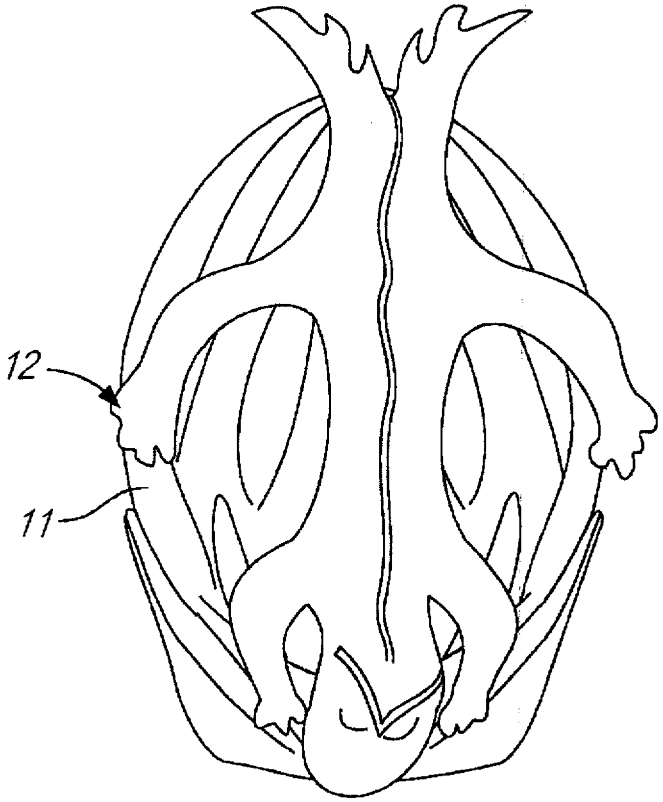
Figure 10:
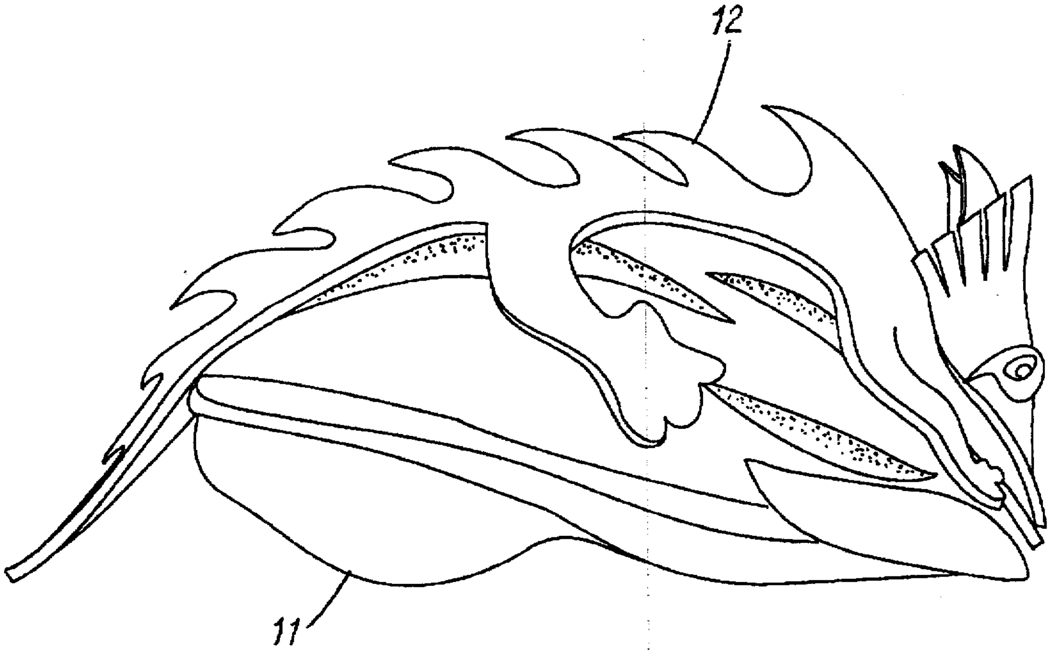
Figure 11:
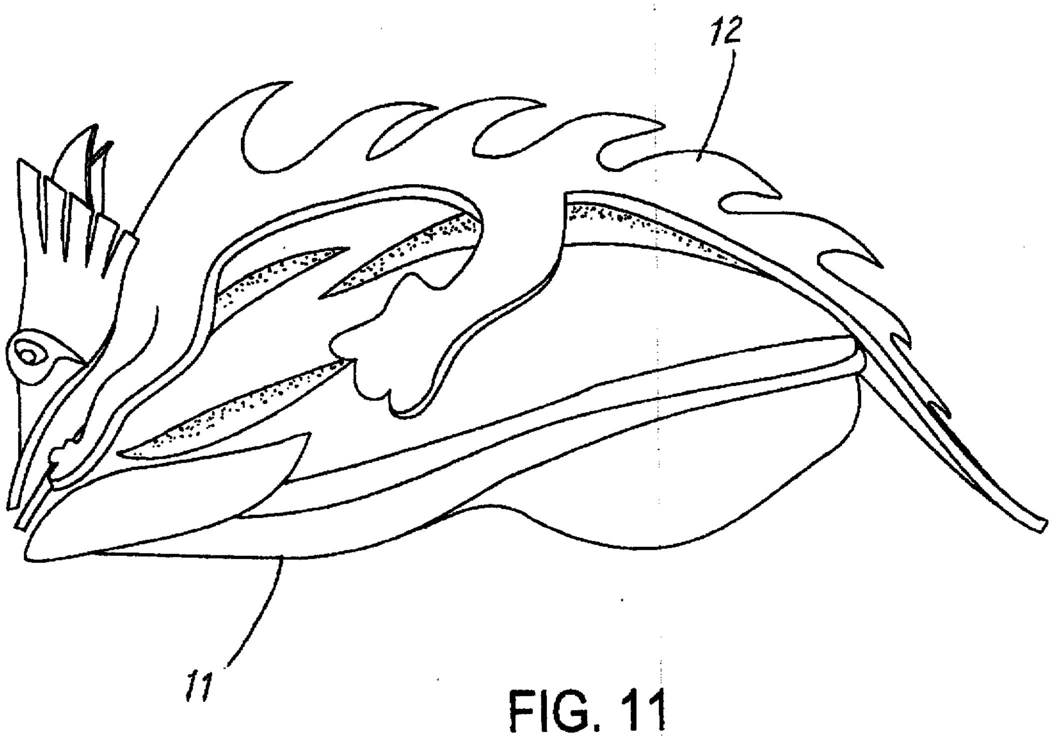
Figure 12:
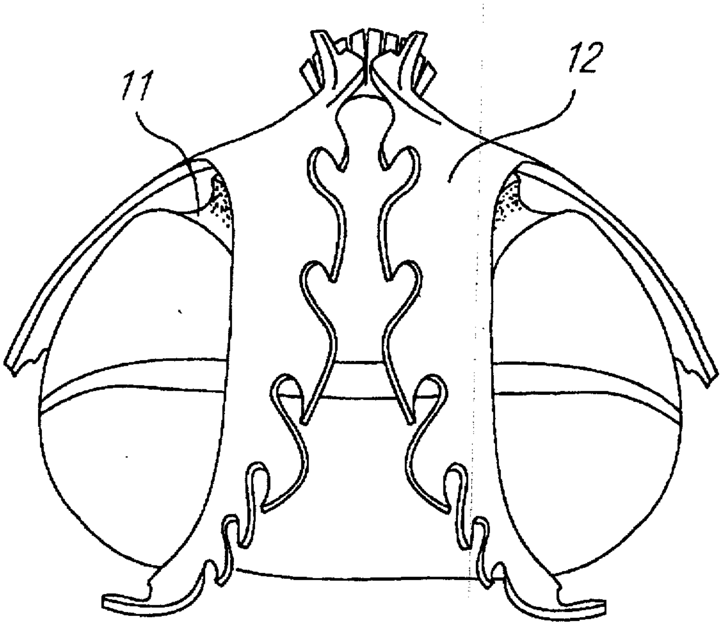
Figure 13:
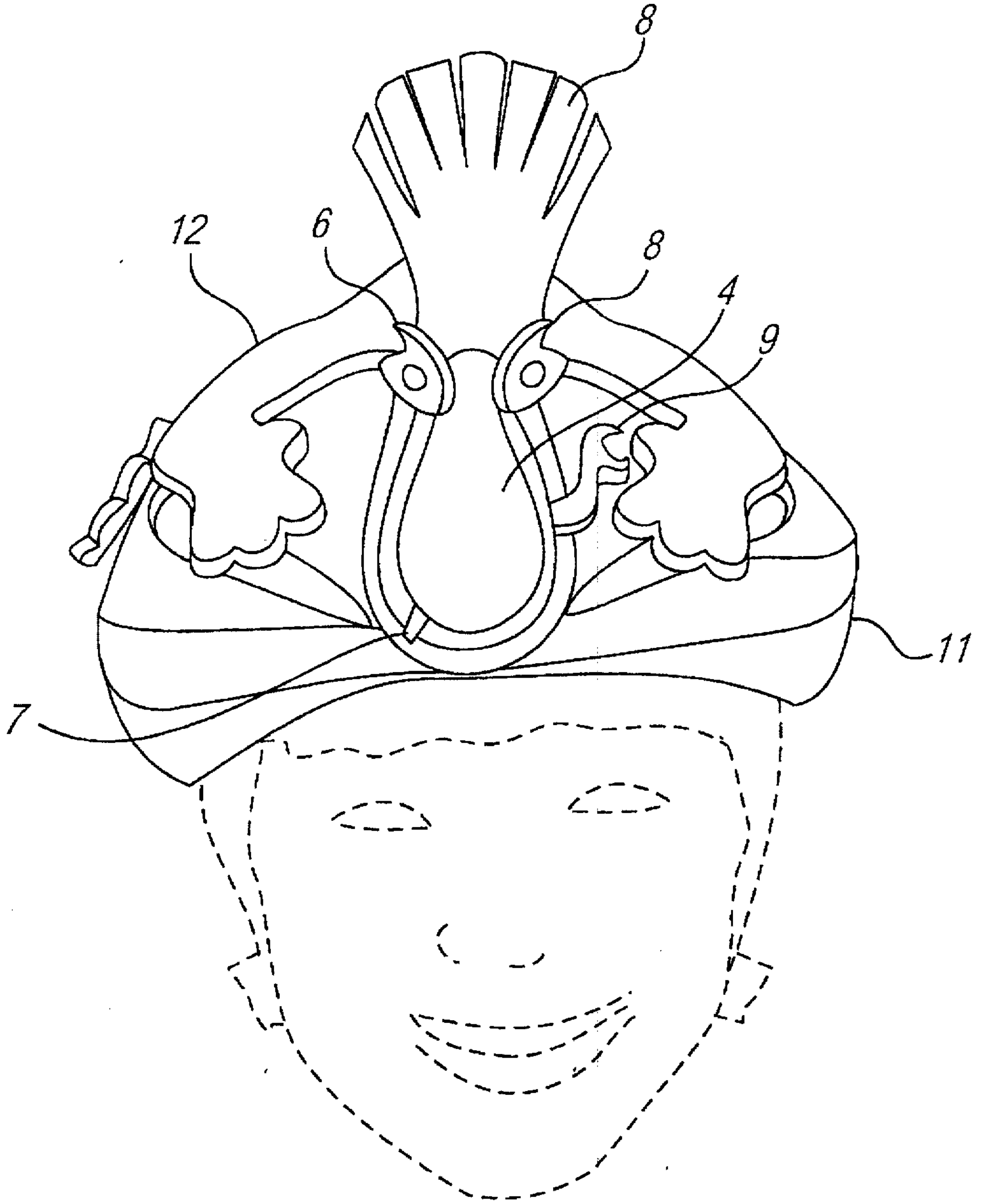

FIG. 1 illustrates the formable sheet material 1 in this case neoprene; however, other formable sheet materials can be used such as, cellular polyethylene, ethylene vinyl acetate (EVA), etc. FIG. 2 illustrates the formable sheet material, 1 with a pattern drawn on using chalk 2. A ridged template of sound board (not shown) is used to create a bifurcated pattern; however, in production, a die cutter with hydraulic press will be necessary, as hand cutting is difficult and time consuming. FIG. 3 illustrates a one-dimensional mortise or FIG. 3 created by hand cutting the formable sheet material 1 using scissors to cut the one-dimensional mortise 3 away from pattern. FIG. 3 also illustrates a nose area 4 and bifurcated arches 5. FIG. 4 illustrates eyes 6, tooth 7, hair 8, and tongue 9. FIG. 5 illustrates placement of self-adhesive hook and loop fasteners 10 to the underside bottom of the bifurcated arches 5 of the one-dimensional mortise 3. FIG. 6 shows, eyes 6, tooth 7, hair 8, and tongue 9, which are affixed to the one-dimensional mortise 3 at the nose area 4 by neoprene glue; however, other adhesive methods such as thermo bonding or other binding materials can be used to adhere facial items such as eyes 6, tooth 7, hair 8, tongue 9 to the nose area 4 of the one-dimensional mortise 3. FIG. 7 illustrates the resultant effect of gluing, using, but not limited to, neoprene glue, to the underside bottom nose area 4 of the one-dimensional mortise 3. The gluing of this location allows the one-dimensional mortise 3 to transform into a bilateral, semi-fixed, ridged three-dimensional figurine 12 when placed onto and adjoined by the self-adhesive hook and loop fasteners 10 to helmet 11. FIG. 8 illustrates placement of the self-adhesive hook and loop fasteners 10 to the helmet 11. FIG. 9 illustrates placement of the semi fixed, ridged three dimensional figurine 12 to helmet 11. FIGS. 10 to 13 illustrate three dimensionality of the semi fixed, ridged three dimensional figurine 12 placed on top of helmet 11 from right side view, left side view, rear view, and front view respectively.

From the description above, a number of advantages of our semi-fixed, rigid three-dimensional formable sheet material figurines 12 become evident. By eliminating the cutting and gluing of several different pieces of formable sheet material 1, this method of gluing, or by other means of adhesion, the underside area of the nose area 4 of the one-dimensional mortise 3 to create the semi-fixed, rigid three dimensional figurines 12 and the use of the formable sheet material 1 itself lends to a quick and relatively inexpensive means of production.

The availability of a large variety of formable sheet material 1 made by a number of different manufacturers means that manufacturing of such items, that is, the semi-fixed rigid three-dimensional formable sheet material figurine attachments 12 for protective helmets 11 (FIGS. 9 to 13), offers an unlimited array of colors, thickness, and textures.

The semi-fixed, rigid three-dimensional formable sheet material figurines 12 (FIGS. 9 to 13) will encourage children aged five and above to wear a protective helmet 11, thus reducing the number of head injuries suffered annually by children who might otherwise not wear a protective helmet during activities such as biking, skateboarding, rollerblading and the like.

Manufacturers of the semi-fixed, rigid three-dimensional formable sheet material figurines 12 (FIGS. 9 to 13) incur little re-tooling expense due to the availability of a hydraulic press and the availability of die cutters. After completion of the manufacturing process, the user simply attaches the figurines to the protective helmet 11, creating a fun and simple solution to motivating a child to wear a protective helmet, thus reducing the number of head injuries suffered by children annually.

The attachment of the self-adhesive hook and loop fasteners 10 to the location of the one-dimensional mortise 3 is illustrated in FIG. 5. One first peels the backing off the self-adhesive hook and loop fasteners 10 attaching pieces along the underside bottom edge of the bifurcated arches 5 on the one-dimensional mortise 3. One then peels the backing off the self-adhesive hook and loop fasteners 10 attaching to the helmet 11 along the off center line edge, bi-laterally, to meet with the semi fixed, ridged three-dimensional figurine 12 (FIGS. 9 to 13).

Accordingly, the simplicity in attaching this invention to a protective helmet will become apparent. In addition, the invention provides these advantages: An economical means to inspire those who might otherwise not wear head projection, thus reducing head injuries in the aforementioned activities such as, bicycling, skateboarding, rollerblading and the like; a material, i.e., simulated animal figure, that does not interfere with the structural soundness of the protective helmet during impact; proper venting from exiting area channels located on most protective helmets, allowing the head to dissipate heat; and an aerodynamic, rigid yet flexible, weather-proof, stable and lightweight helmet attachment that is easy to use.

In addition to these physical/economical advantages, the method advantages allow the use of existing production methods and lend a new use for existing formable sheet materials. Furthermore, a method is provided to create a semi-fixed, rigid three dimensional figurine out of formable sheet material for protective helmets by simply gluing an area under the nose area.

Although the description above contains much specificity, it should not be construed as limiting the scope of the invention, but merely providing illustration of some of the presently preferred embodiments of this invention. For example, the gluing could be replaced by stapling or by heat transfer. The figures show examples of a dinosaur; however, birds, reptiles, mammals, fish, etc could be used as figurines.

Thus, the scope of the invention should be determined by the appended claims and their legal equivalents, rather than by the examples given.

What is claimed is:

1. An article of wearing apparel, comprising:

a helmet having an upper outer surface;

a three-dimensional, simulated animal figure of resiliently flexible sheet material, said figure having a simulated animal head and simulated opposite animal body portions extended rearwardly from the head in transversely spaced relation to each other; and the head and the body portions being fastened to the outer surface of the helmet with the figure in upstanding position on the helmet and appearing as a simulated animal on top of the helmet but being resiliently pressable downwardly against the helmet.

2. The article of claim 1, wherein said figure and helmet defining openings therebetween to provide for the passage of air therethrough when the helmet is used by a wearer.

3. The article of claim 1, wherein the figure also has simulated animal appendages extended outwardly from each body portion; and wherein the the appendages are fastened to the helmet.

4. The article of claim 1, wherein the the head and the body portions are releasably fastened to the outer surface of the helmet.

5. The article of claim 1, wherein the helmet also has a front, a rear, and opposite sides;

wherein the head of the figure is fastened to the front of the helmet;

wherein the opposite body portions extend from the head rearwardly of the helmet along opposite sides of the helmet; and wherein the appendages extend from the body portions downwardly along the opposite sides, the front and the rear of the helmet.

6. The article of claim 1, wherein there are a plurality of self-adhesive hook and loop fasteners, some of which are secured at various locations to the outer surface of the helmet and others of which are secured to the head and body portions in positions alignable with the fasteners on the helmet for connection therewith.

7. The article of claim 1, wherein the helmet is a bicycle helmet and has ventilation openings therein; and wherein the figure is fastened to and upstands from the helmet in spaced relation to the ventilation openings so as not to interfere with ventilation therethrough.

8. The article of claim 1, wherein the figure is initially a flat piece removed from a larger piece of said sheet material, said flat piece including the head and the opposite body portions, said head including opposed head portions respectively connected to the opposite body portions;

wherein the opposed head portions are interconnected thereby to form the flat piece into a three-dimensional figure with the body portions extended rearwardly from said opposed head portions; and wherein the figure is fastened to the helmet so that the head and the appendages support the body and head portions in said upstanding position.

9. The article of claim 8, wherein the flat piece initially removed from a larger piece of said sheet material also has appendages extended outwardly from each body portion;

wherein there are a plurality of self-adhesive hook and loop fasteners, some of which are secured at various locations to the outer surface of the helmet and others of which are secured to the head and body portions and the appendages in positions alignable with the fasteners on the helmet for releasable connection therewith;

wherein the head of the figure is at the front of the helmet;

wherein the opposite body portions extend from the head rearwardly of the helmet along opposite sides of the helmet;

wherein the appendages extend from the body portions downwardly along the opposite sides and the front and rear of the helmet; and wherein the fasteners releasably interconnect the head and body portions and the appendages to the helmet at said front, side and rear of the helmet.

10. The article of claim 1, wherein the helmet has a rim;

wherein the upper outer surface of the helmet is outwardly convex;

wherein the head includes a forwardly projecting face terminating in a nose and mouth and having forwardly facing eyes, said head also having opposed rear portions;

wherein the body portions are upwardly arched relative to the outer surface of the helmet and project rearwardly from said opposed rear portions of the head along the top and sides of the helmet;

wherein the opposed rear portions are joined;

wherein the face projects downwardly and forwardly from said joined rear portions at the front of the helmet and adjacent to the rim thereof;

wherein there is a rearwardly projecting tail portion at the rear of the helmet;

wherein there are spaced front and rear leg appendages that project downwardly from the body portions along the sides of the helmet and adjacent to the rim thereof; and wherein the sheet material is selected from the group of materials consisting of neoprene, cellular polyethylene and ethylene vinyl acetate.

11. A article of manufacture, comprising, a three-dimensional, simulated animal figure of flexible sheet material and initially being a flat two-dimensional piece having opposite simulated animal head and body portions with the body portions extended outwardly from the head portions; and the head portions being joined together in opposed relation to each other with the body portions extended rearwardly and outwardly from the head portions thereby forming the figure in three-dimensions and so that the body portions can support the figure in an upstanding position.

12. The article of claim 11, wherein the figure is initially cut out with appendages that extend from the body portions; and wherein the appendages extend downwardly from the body portions with the head portions joined and assist in supporting the figure in upstanding position.

13. The article of claim 11, wherein there are fasteners on the body portions adapted to fasten to a supporting surface thereby to assist in supporting the figure in upstanding position.

14. The article of claim 11, wherein the figure is initially has appendages that extend from the body portions;

wherein the appendages extend downwardly from the body portions with the head portions joined and assist in supporting the figure in upstanding position; and wherein there are fasteners on the head and body portions and the appendages adapted to fasten the head and body portions and appendages to a supporting surface thereby to assist in supporting the figure in upstanding position.

15. The article of claim 11, wherein the sheet material is selected from the group of materials consisting of neoprene, cellular polyethylene and ethylene vinyl acetate.

16. The article of claim 11, wherein the head includes a forwardly projecting face terminating in a nose and mouth and having forwardly facing eyes and opposite rear portions constituting said opposite head portions;

wherein the face projects downwardly and forwardly from said joined opposite portions;

wherein the body portions project rearwardly from the opposite head portions in upwardly arched manner;

wherein the body portions have tail portions rearwardly projecting therefrom; and wherein there are spaced front and rear leg appendages that project downwardly from the body portions.

17. The article of claim 16, wherein the fasteners are on the leg appendages for helping to support the figure in upstanding position.

* * * * *

UNITED STATES PATENT AND TRADEMARK OFFICE

CERTIFICATE OF CORRECTION

PATENT NO. : 5,916,657

DATED : June 29, 1999

INVENTOR(S) : Jeff Magallanes and Piper Magallanes

It is certified that error appears in the above-identified patent and that said Letters Patent is hereby corrected as shown below:

On the title page: Item [54] and Column 1, line 3, should read -- THREE DIMENSIONAL FIGURE OF SHEET MATERIAL --.

In the Claims:

In Claim 11, line 1, "A" should be --An--.

The title page, should be deleted to be replaced with the attached title page.

The drawing sheets, consisting of Figs. 1-13, should be deleted to be replaced with the drawing sheets, consisting of Figs. 1-13, as shown on the attached pages.

Signed and Sealed this

Eighteenth Day of July, 2000

Attest:

Q. TODD DICKINSON

Attesting Officer

*Director of Patents and Trademarks*

United States Patent [19]
Magallanes et al.

[11] Patent Number: 5,916,657
[45] Date of Patent: Jun. 29, 1999

[54] THREE-DIMENSIONAL FORMABLE SHEET MATERIAL FIGURINE ATTACHMENTS FOR PROTECTIVE HELMETS

[76] Inventors: Jeff Magallanes; Piper Magallanes, both of 208 Barbee Ct., Marina, Calif. 93933

[21] Appl. No.: 08/902,173

[22] Filed: Jul. 29, 1997

[51] Int. Cl.[6] ............ B32B 3/02

[52] U.S. Cl. ............ 428/79; 428/187; 428/200; 428/343; 428/475.5; 428/195

[58] Field of Search ............ 428/79, 187, 355, 428/200, 542.2, 347, 343, 480, 475.5, 485, 195

[56] References Cited

U.S. PATENT DOCUMENTS

| | | | |
|---|---|---|---|
| 4,786,349 | 11/1988 | Mahn, Sr. | 156/234 |
| 4,971,644 | 11/1990 | Mahn, Sr. et al. | 156/253 |
| 5,133,819 | 7/1992 | Croner | 156/230 |
| 5,149,589 | 9/1992 | Naritomi et al. | 428/412 |
| 5,338,603 | 8/1994 | Mahn, Sr. et al. | 428/349 |
| 5,411,783 | 5/1995 | Mahn, Jr. | 428/79 |
| 5,556,491 | 9/1996 | Servanty et al. | 156/64 |
| 5,622,587 | 4/1997 | Barthelman | 156/251 |

*Primary Examiner*—Merrick Dixon
*Attorney, Agent, or Firm*—Leo F. Costello

[57] ABSTRACT

An article of wearing apparel for the head and a method making the same. The article includes a helmet having an upper outer surface, a three-dimensional, simulated animal figure cut out of resiliently flexible sheet material with the figure having a simulated animal head and simulated opposite animal body portions extended rearwardly from the head in transversely spaced relation to each other. The head and the body portions are fastened to the outer surface of the helmet so that the figure is in upstanding position on the helmet and appears as a simulated animal on top of the helmet but can be resiliently pressed downwardly against the helmet. The method includes cutting out of a sheet of resiliently flexible material a two-dimensional pattern of a desired animal figure that has a head and a pair of body portions so with the pattern laid out flat, the body portions individually project outwardly from the head about an imaginary line of symmetry extending between the head portions, folding the head on the line of symmetry to form a pair of head portions and to bring the head portions into face-to-face relationship and the body portions into face-to-face relationship, and joining at least one pair of the face-to-face portions thereby to form a three-dimensional figure.

17 Claims, 13 Drawing Sheets

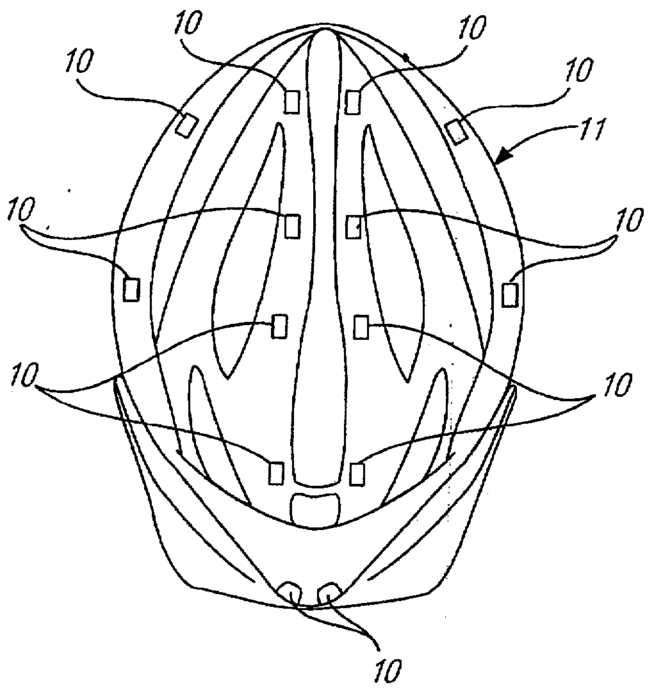

4/7